(12) United States Patent
Fan et al.

(10) Patent No.: US 11,719,905 B2
(45) Date of Patent: Aug. 8, 2023

(54) OPTICAL MEMBER DRIVING MECHANISM

(71) Applicant: TDK TAIWAN CORP., Taoyuan (TW)

(72) Inventors: Chen-Hsien Fan, Taoyuan (TW); Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 247 days.

(21) Appl. No.: 17/165,578

(22) Filed: Feb. 2, 2021

(65) Prior Publication Data

US 2021/0157036 A1 May 27, 2021

Related U.S. Application Data

(63) Continuation of application No. 16/257,394, filed on Jan. 25, 2019, now Pat. No. 10,976,476.

(Continued)

(51) Int. Cl.
*G02B 7/02* (2021.01)
*G02B 27/64* (2006.01)
(Continued)

(52) U.S. Cl.
CPC .......... *G02B 7/023* (2013.01); *F03G 7/065* (2013.01); *F03G 7/0614* (2021.08); *G02B 3/12* (2013.01);
(Continued)

(58) Field of Classification Search
CPC ............ G02B 7/023; G02B 3/12; G02B 3/14; G02B 6/0025; G02B 6/0066; G02B 7/08; G02B 7/09; G02B 7/102; G02B 7/1805; G02B 7/182; G02B 7/1821; G02B 13/0065; G02B 13/0075; G02B 13/009; G02B 26/004; G02B 26/0816; G02B 26/0883; G02B 27/0068; G02B 27/0955; G02B 27/0972; G02B 27/0977; G02B 27/646; G02B 5/003; G02B 13/004; G02B 7/1828; G02B 7/04; F03G 7/0614; F03G 7/065; G03B 5/00; G03B 9/06; G03B 9/14; G03B 13/36; G03B 17/17; G03B 5/04; G03B 2205/0007; G03B 2205/0015; G03B 2205/0069; G03B 9/04; G03B 9/10; G03B 13/32; G06F 1/1686; G06F 1/1626; G06T 7/521; G06T 7/97; G06T 15/08;
(Continued)

(56) References Cited

U.S. PATENT DOCUMENTS 10,976,476 B2 * 4/2021 Fan .................... G02B 3/14
2010/0091120 A1 * 4/2010 Nagata ................ H04N 5/2257
359/557

(Continued)

*Primary Examiner* — Mohammed A Hasan
(74) *Attorney, Agent, or Firm* — Muncy, Geissler, Olds & Lowe, P.C.

(57) ABSTRACT

An optical element driving mechanism is provided. The optical element driving mechanism includes a movable portion, a fixed portion, a driving assembly, and at least three damping materials. The movable portion is configured to connect an optical member that has an optical axis. The movable portion is movable relative to the fixed portion. The driving assembly drives the movable portion to move relative to the fixed portion. The damping materials are located on an imaginary plane, and the imaginary plane is parallel to the optical axis.

20 Claims, 11 Drawing Sheets

Related U.S. Application Data (60) Provisional application No. 62/785,593, filed on Dec. 27, 2018, provisional application No. 62/782,664, filed on Dec. 20, 2018, provisional application No. 62/780,077, filed on Dec. 14, 2018, provisional application No. 62/760,320, filed on Nov. 13, 2018, provisional application No. 62/753,716, filed on Oct. 31, 2018, provisional application No. 62/711,036, filed on Jul. 27, 2018, provisional application No. 62/703,147, filed on Jul. 25, 2018, provisional application No. 62/688,694, filed on Jun. 22, 2018, provisional application No. 62/682,671, filed on Jun. 8, 2018, provisional application No. 62/625,600, filed on Feb. 2, 2018, provisional application No. 62/621,967, filed on Jan. 25, 2018.

(51) Int. Cl.
| | |
|---|---|
| G03B 9/14 | (2021.01) |
| G02B 13/00 | (2006.01) |
| G02B 7/182 | (2021.01) |
| G02B 7/08 | (2021.01) |
| F03G 7/06 | (2006.01) |
| G02B 3/12 | (2006.01) |
| H04N 23/45 | (2023.01) |
| H04N 23/51 | (2023.01) |
| H04N 23/54 | (2023.01) |
| H04N 23/55 | (2023.01) |
| H04N 23/56 | (2023.01) |
| H04N 23/57 | (2023.01) |
| H04N 23/73 | (2023.01) |
| G03B 9/06 | (2021.01) |
| G02B 7/09 | (2021.01) |
| G03B 5/00 | (2021.01) |
| G03B 13/36 | (2021.01) |
| H02K 41/035 | (2006.01) |
| G02B 7/10 | (2021.01) |
| G06F 1/16 | (2006.01) |
| G02B 3/14 | (2006.01) |
| G02B 26/00 | (2006.01) |
| G02B 27/00 | (2006.01) |
| G02B 26/08 | (2006.01) |
| G03B 17/17 | (2021.01) |
| F21V 8/00 | (2006.01) |
| G02B 27/09 | (2006.01) |
| G09G 5/00 | (2006.01) |
| G02B 7/18 | (2021.01) |
| G06T 7/521 | (2017.01) |
| G06T 7/00 | (2017.01) |
| G06T 15/08 | (2011.01) |
| G03B 5/04 | (2021.01) |
| G02B 5/00 | (2006.01) |

(52) U.S. Cl.
CPC ............ *G02B 3/14* (2013.01); *G02B 6/0025* (2013.01); *G02B 6/0066* (2013.01); *G02B 7/08* (2013.01); *G02B 7/09* (2013.01); *G02B 7/102* (2013.01); *G02B 7/182* (2013.01); *G02B 7/1805* (2013.01); *G02B 7/1821* (2013.01); *G02B 13/009* (2013.01); *G02B 13/0065* (2013.01); *G02B 13/0075* (2013.01); *G02B 26/004* (2013.01); *G02B 26/0816* (2013.01); *G02B 26/0883* (2013.01); *G02B 27/0068* (2013.01); *G02B 27/0955* (2013.01); *G02B 27/0972* (2013.01); *G02B 27/0977* (2013.01); *G02B 27/646* (2013.01); *G03B 5/00* (2013.01); *G03B 9/06* (2013.01); *G03B 9/14* (2013.01); *G03B 13/36* (2013.01); *G03B 17/17* (2013.01); *G06F 1/1686* (2013.01); *G06T 7/521* (2017.01); *G06T 7/97* (2017.01); *G06T 15/08* (2013.01); *G09G 5/003* (2013.01); *H02K 41/0356* (2013.01); *H04N 23/45* (2023.01); *H04N 23/51* (2023.01); *H04N 23/54* (2023.01); *H04N 23/55* (2023.01); *H04N 23/56* (2023.01); *H04N 23/57* (2023.01); *H04N 23/73* (2023.01); *G02B 5/003* (2013.01); *G02B 13/004* (2013.01); *G03B 5/04* (2013.01); *G03B 2205/0007* (2013.01); *G03B 2205/0015* (2013.01); *G03B 2205/0069* (2013.01); *G06T 2207/10028* (2013.01); *G06T 2207/10048* (2013.01); *G09G 2354/00* (2013.01)

(58) Field of Classification Search
CPC .......... G06T 2207/10028; G06T 2207/10048; G09G 5/003; G09G 2354/00; H02K 41/0356; H04N 5/2252; H04N 5/2253; H04N 5/2254; H04N 5/2256; H04N 5/2257; H04N 5/2258; H04N 5/2353
USPC ........................................................ 359/819
See application file for complete search history.

(56) References Cited

U.S. PATENT DOCUMENTS

| | | | |
|---|---|---|---|
| 2011/0185375 A1* | 7/2011 | Sato ................... | G11B 7/0932 720/672 |
| 2018/0210160 A1* | 7/2018 | Wu .................... | G03B 5/04 |
| 2019/0227258 A1 | 7/2019 | Kao et al. | |
| 2019/0230232 A1* | 7/2019 | Soga .................. | H04N 1/00331 |
| 2019/0230262 A1* | 7/2019 | Wang .................. | G03B 9/06 |
| 2019/0324225 A1 | 10/2019 | Wu et al. | |

* cited by examiner

OPTICAL MEMBER DRIVING MECHANISM

CROSS REFERENCE TO RELATED APPLICATIONS

The present application is a Continuation Application of U.S. patent application Ser. No. 16/257,394, filed on Jan. 25, 2019, which claims priority to U.S. Provisional Patent Application No. 62/621,967, filed on Jan. 25, 2018, No. 62/625,600, filed on Feb. 2, 2018, No. 62/682,671, filed on Jun. 8, 2018, No. 62/688,694, filed on Jun. 22, 2018, No. 62/703,147, filed on Jul. 25, 2018, No. 62/711,036, filed on Jul. 27, 2018, No. 62/753,716, filed on Oct. 31, 2018, No. 62/760,320, filed on Nov. 13, 2018, No. 62/780,077, filed on Dec. 14, 2018, No. 62/782,664, filed on Dec. 20, 2018, No. 62/785,593, filed on Dec. 27, 2018, which are incorporated by reference herein in their entirety.

BACKGROUND

Technical Field

The disclosure relates to an optical member driving mechanism, and in particular to an optical member driving mechanism with an elastic member electrically connected to a driving assembly.

Description of the Related Art

With the development of technology, many electronic devices (such as smartphones and digital cameras) nowadays perform a camera or video function. The usage of these electronic devices has become increasingly widespread, and the electronic devices have been designed for convenience and miniaturization to provide more choices for users.

The electronic devices with a camera or video function usually have a lens driving module disposed therein to drive an optic to move along an optical axis. Therefore, an autofocus (AF) function is achieved. Light may pass through the optic and form an image on a photosensitive member.

However, the consumers' expectations regarding image quality is getting stricter, to the degree that multiple lenses now need to be disposed in the optic along the optical axis, whereby optical performance that satisfies consumers may be achieved. That way, it is difficult to reduce the size, along the optical axis, of the optic, making the miniaturization of the electronic devices difficult. Therefore, how to solve the aforementioned problems has become an important topic.

BRIEF SUMMARY

The present disclosure provides an optical member driving mechanism. The optical member driving mechanism includes a movable portion, a fixed portion, a driving assembly, and at least three damping materials. The movable portion is configured to connect to an optical member that has an optical axis. The movable portion is movable relative to the fixed portion. The driving assembly drives the movable portion to move relative to the fixed portion. The damping materials are located on an imaginary plane, and the imaginary plane is parallel to the optical axis.

In an embodiment, when viewed along the optical axis, the fixed portion having a polygonal structure further comprises a first side and a second side, the first side extends in a first direction, the second side extends in a second direction, a length of the first side is less than a length of the second side, and the first direction is not parallel to the second direction. In an embodiment, the imaginary plane is parallel to the second side, and the first direction is perpendicular to the second direction.

In an embodiment, the movable portion further comprises a plurality of damping material limiting portions, and the damping materials are respectively disposed between each of the damping material limiting portions and the fixed portion. In an embodiment, a lower surface of each of the damping material limiting portions has at least one protrusion disposed towards the fixed portion. In an embodiment, the damping materials are each disposed on the protrusion of each of the damping material limiting portions. In an embodiment, the damping material limiting portion has a plurality of protrusions formed on the lower surface, and the damping materials are disposed between two of the protrusions. In an embodiment, a width of one of the damping materials is less than a width of the corresponding damping material limiting portion.

In an embodiment, when viewed along the optical axis, the optical member is located between two of the damping materials. In an embodiment, the optical member driving mechanism further includes a plurality of first elastic members extending in a third direction that is perpendicular to the optical axis, wherein when viewed along the optical axis, the damping materials are located between the elastic members.

In an embodiment, the elastic members comprise metallic material and are configured to transmit electrical signals. In an embodiment, the optical member driving mechanism further includes a plurality of second elastic members extending in a fourth direction that is perpendicular to the third direction, wherein the second elastic members are connected to the first elastic members and the movable portion.

In an embodiment, the damping materials contact the movable portion and the fixed portion. In an embodiment, the driving assembly includes: a magnetic member and a driving coil, wherein the magnetic member or the driving coil is disposed on the movable portion, and the other of the magnetic member or the driving coil is disposed on the fixed portion. In an embodiment, when viewed in a direction that is parallel to the optical axis, the driving assembly does not overlap the damping materials. In an embodiment, the fixed portion further includes: a circuit component and a base, wherein the circuit component is disposed on the base, and the damping materials are disposed on the circuit component.

In an embodiment, the fixed portion has a top surface and a plurality of sidewalls extending from edges of the top surface, a first opening and a second opening are respectively disposed on the sidewalls, and the optical axis passes through the first opening and the second opening. In an embodiment, a size of the first opening is different from a size of the second opening. In an embodiment, the first opening is closer to a light incident direction of the optical member than the second opening, and the first opening is greater than the second opening.

In an embodiment, a plurality of bonding recesses are formed on the movable portion, and the bonding recesses are symmetrically disposed towards the optical member.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
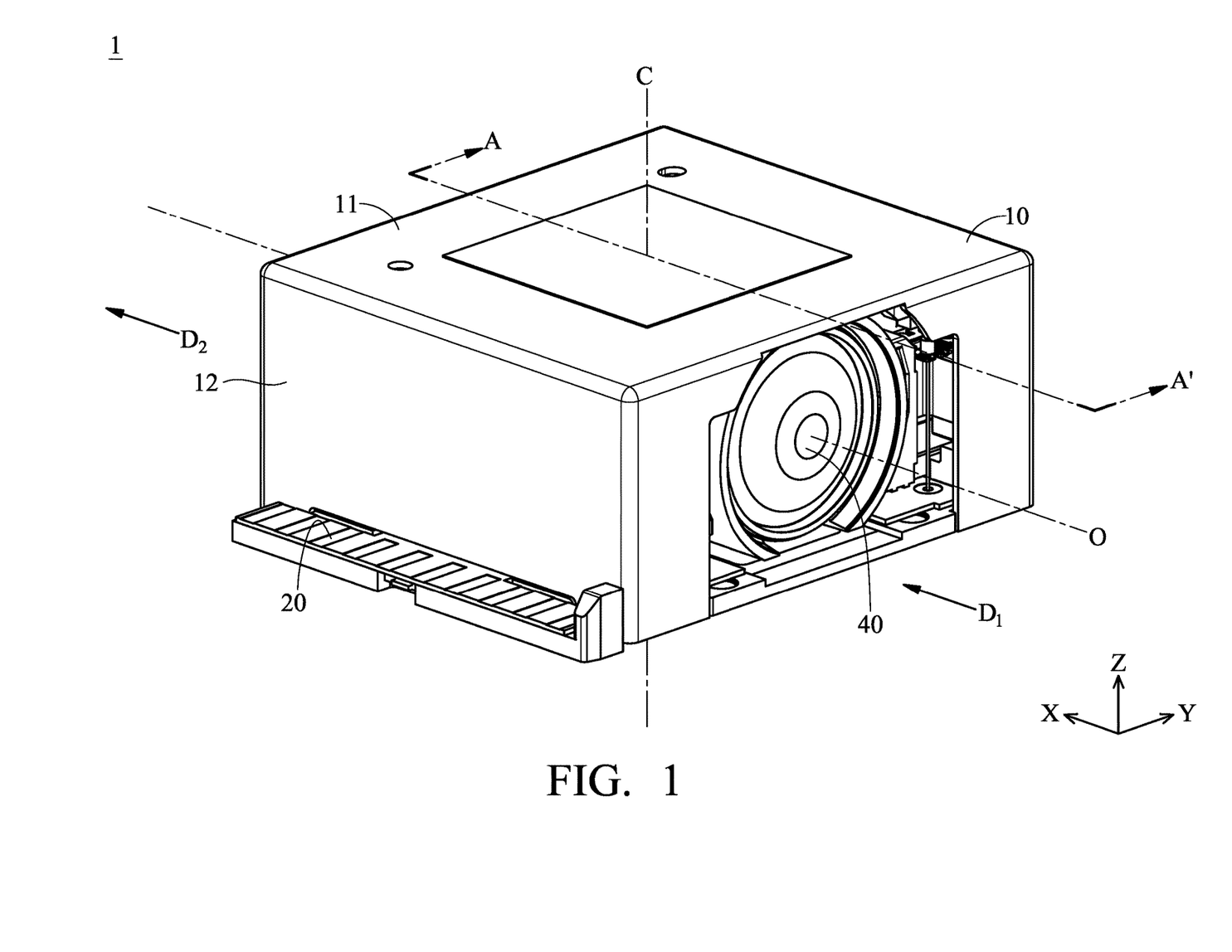
FIG. 1 is a perspective view illustrating an optical member driving mechanism in accordance with an embodiment of the present disclosure.

Refer to FIG. 1, wherein FIG. 1 is a perspective view illustrating an optical member driving mechanism 1 in accordance with an embodiment of the present disclosure. It should be noted that, in this embodiment, the optical member driving mechanism 1 may be disposed in the electronic devices (not shown) with camera function for driving an optical member 40, and can perform an autofocus (AF) and/or optical image stabilization (OIS) function.

Figure 2:
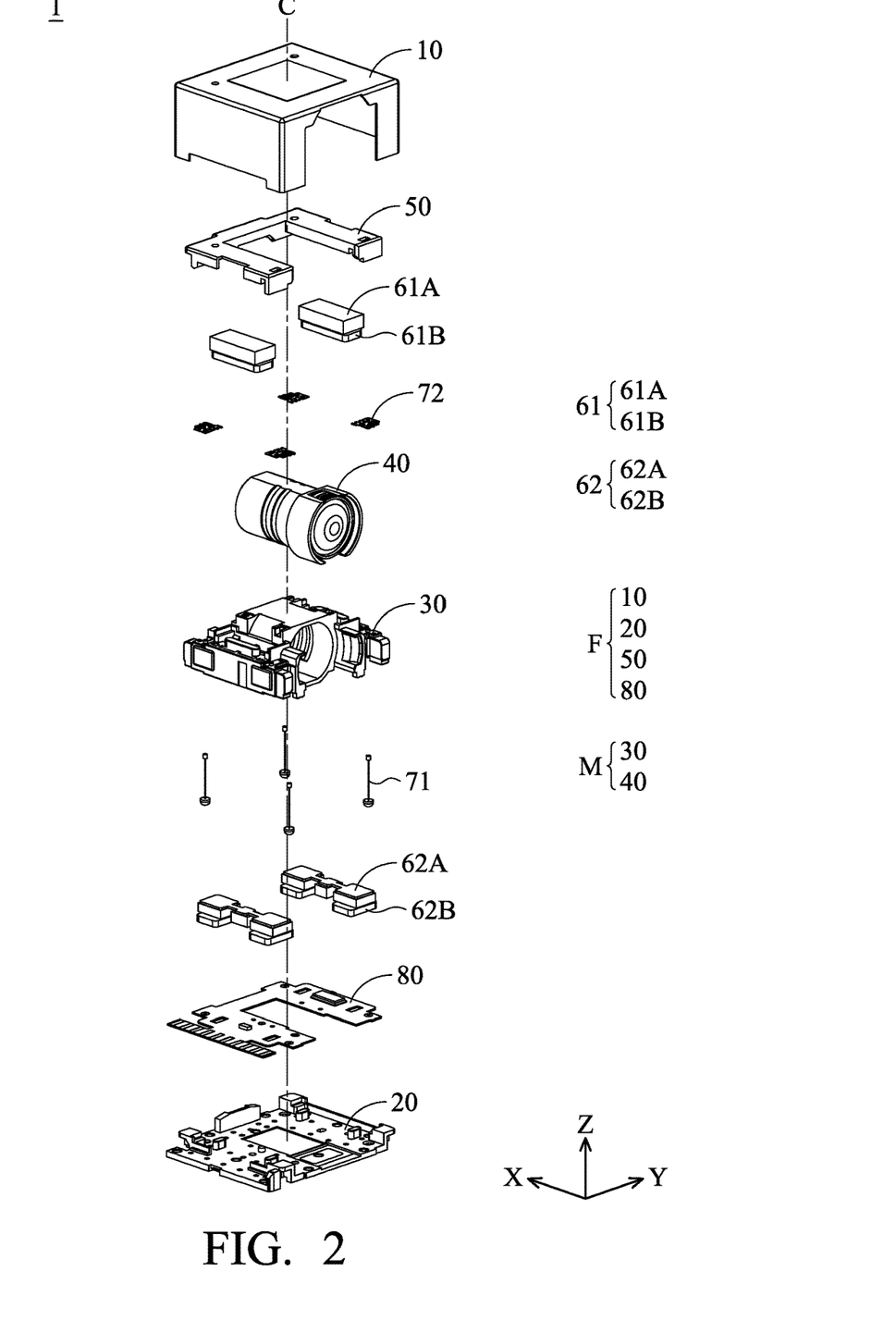
FIG. 2 is an exploded view illustrating the optical member driving mechanism shown in FIG. 1.

Refer to FIG. 2, wherein FIG. 2 is an exploded view illustrating the optical member driving mechanism 1 shown in FIG. 1. In the present embodiment, the optical member driving mechanism 1 has a substantial rectangular structure. The optical member driving mechanism 1 mainly includes a fixed portion F, a movable portion M, a plurality of first elastic members 71, a plurality of second elastic members 72, a first driving assembly 61, and a second driving assembly 62. The fixed portion F includes a housing 10, a base 20, a frame 50, and a circuit component 80. The housing 10 has a hollow structure, which includes a top surface 11, four sidewalls 12, wherein the housing 10 and the base 20 may be assembled as a hollow case for containing interior members of the optical member driving mechanism 1. The frame 50 is disposed in the housing 10, and affixed to the housing 10. The circuit component 80 is disposed on the base 20 for transmitting electric signals, performing function of autofocus and/or optical image stabilization. For example, the optical member driving mechanism 1 may control the position of the optical member 40 in order to perform camera function.

The movable portion M is movably connected to the fixed portion F. The movable portion M mainly includes a carrier 30, and the carrier 30 carries the optical member 40. As shown in FIG. 2, the carrier 30 is movably connected to the housing 10 and the base 20. The first elastic members 71 extend in a first direction (Z-axis), and are elastically connected to the base 20 and the carrier 30, wherein the first direction is perpendicular to the optical axis O. In addition, the second elastic members 72 are disposed on the carrier 30, and connected to the first elastic members 71 and the carrier 30. In other words, the carrier 30 may be connected to the base 20 via the first elastic members 71 and the second elastic members 72, and the first elastic members 71 and the second elastic members 72 are metallic materials.

The first driving assembly 61 may include a first magnetic member 61A and a corresponding first driving coil 61B. The first magnetic member 61A is disposed on the frame 50, and the first driving coil 61B is disposed on the carrier 30. When a current is applied to the first driving coil 61B, an electromagnetic driving force may be generated by the first driving coil 61B and the first magnetic member 61A (namely, the first driving assembly 61) to drive the carrier 30 and the optical member 40 to move along the first direction (Z-axis) relative to the base 20. Therefore, the autofocus or optical image stabilization function is performed.

In addition, the second driving assembly 62 may include a second magnetic member 62A and a corresponding second driving coil 62B. The second magnetic member 62A is disposed on the carrier 30, and the second driving coil 62B is disposed on the base 20. When a current is applied to the second driving coil 62B, an electromagnetic driving force may be generated by the second driving assembly 62 to drive the carrier 30 and the optical member 40 to move along the optical axis (X-axis) relative to the base 20. Therefore, the autofocus function is performed. The carrier 30 may be movably suspended between the frame 50 and the base 20 by the electromagnetic driving forces of the first driving assembly 61, the second driving assembly 62, and the forces of the first elastic members 71, the second elastic members 72.

Figure 3:
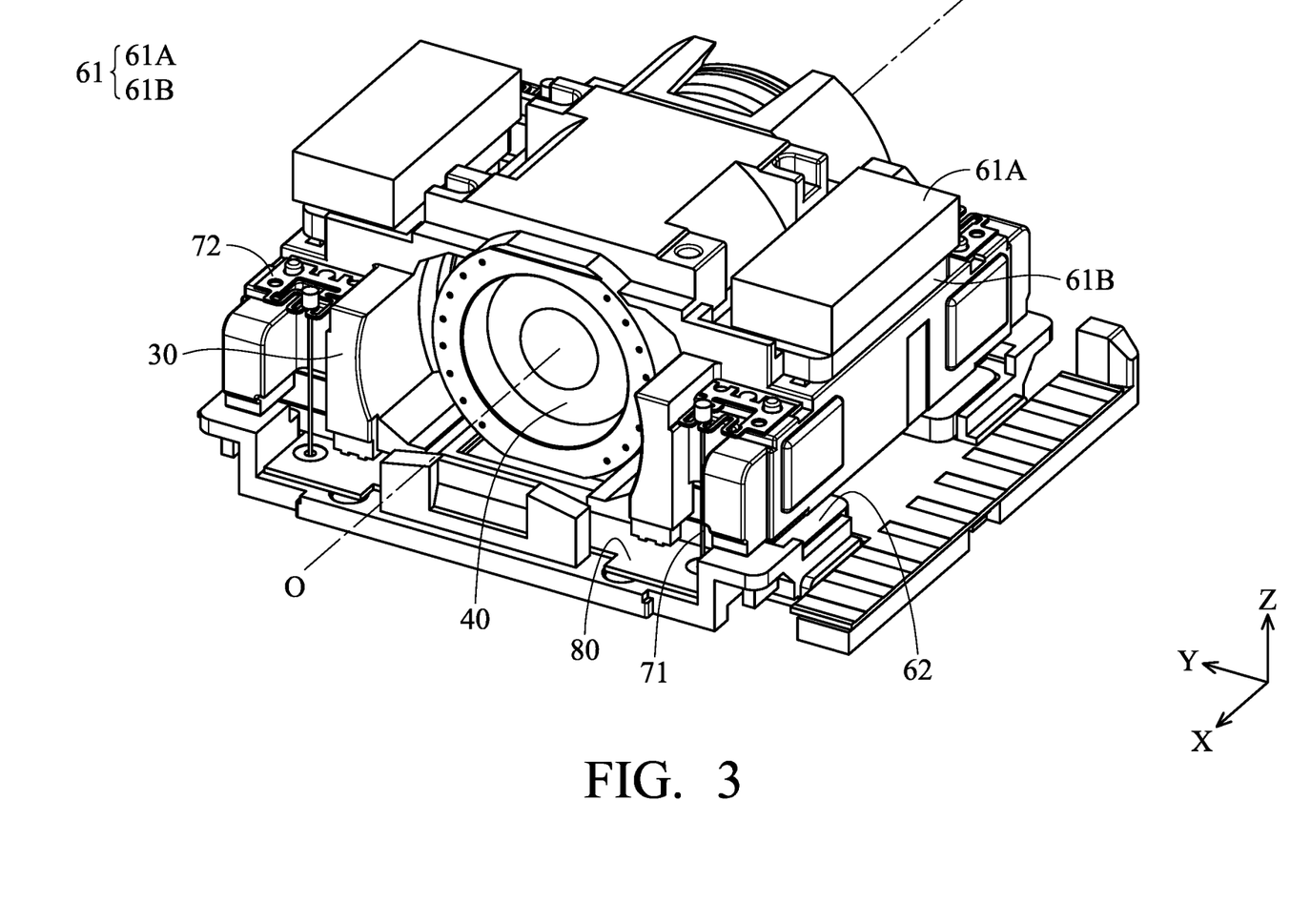
FIG. 3 is a perspective view illustrating the interior of the optical member driving mechanism shown in FIG. 1.

Refer to FIG. 3, wherein FIG. 3 is a perspective view illustrating the interior of the optical member driving mechanism 1 shown in FIG. 1. It should be noted that for the sake of clearly illustrating the structure inside the optical member driving mechanism 1, the housing 10 and the frame 50 are not illustrated. In the present embodiment, the first driving coil 61B of the first driving assembly 61 is connected to the first elastic members 71 via the second elastic members 72. Therefore, the electrical signals may be transmitted from the circuit component 80 to the first driving coil 61B via the first elastic members 71 for controlling the position of the carrier 30 by the first driving assembly 61. In the present embodiment, the first driving coil 61B is electrically connected to the circuit component 80 via the first driving coil 61B, and whereby the circuit for electrically connecting the first driving coil 61B and the circuit component 80 may not be additionally disposed. Therefore, the circuit structure in the optical member driving mechanism 1 may be simplified.

Figure 4:
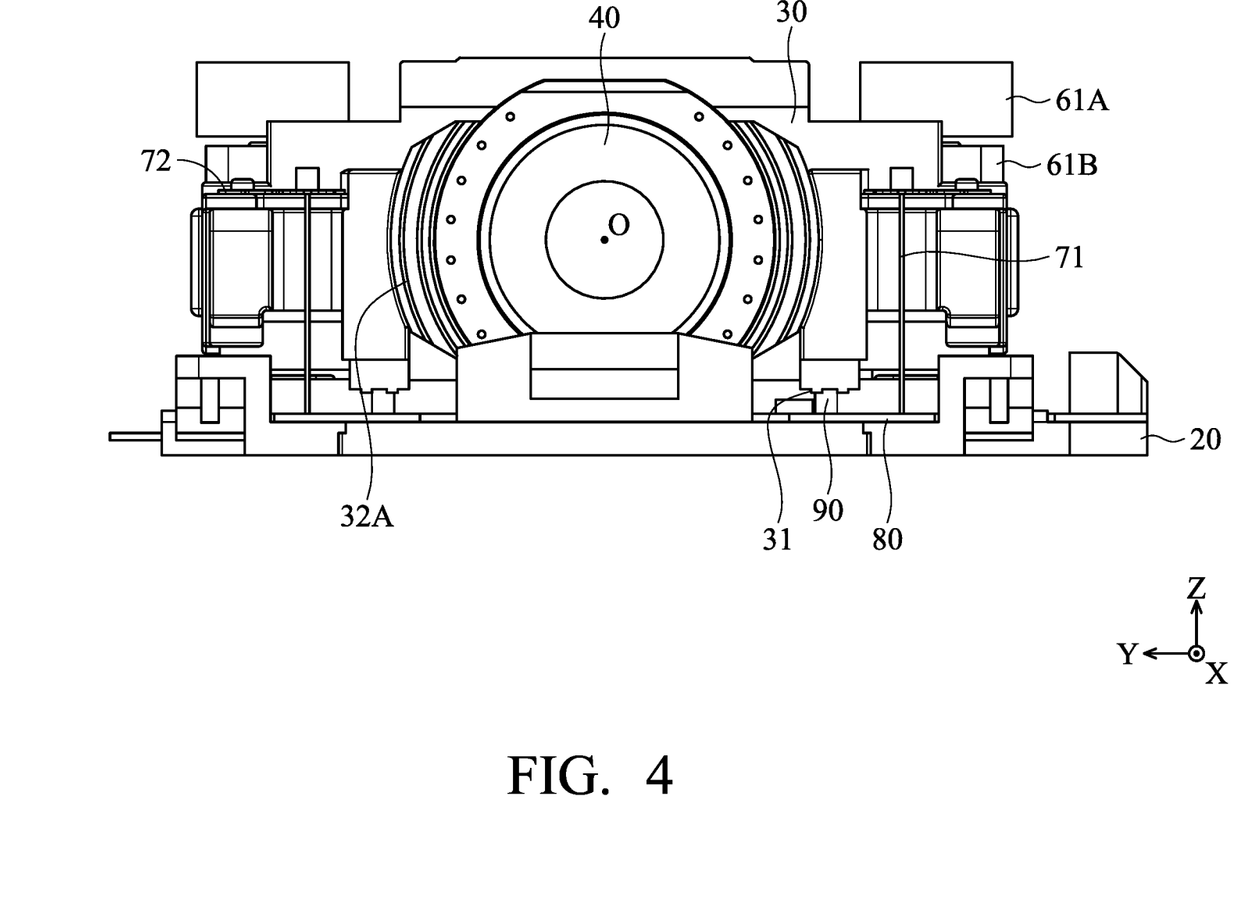
FIG. 4 is a schematic view illustrating the optical member driving mechanism as viewed in a light exit direction.

FIG. 4 is a schematic view illustrating the optical member driving mechanism 1 as viewed in a light exit direction Do. As shown in FIG. 4, the optical member driving mechanism 1 further includes a plurality of damping materials 90, which are disposed between the circuit component 80 and the carrier 30, and located on an imaginary plane parallel to the optical axis O (namely, the plane parallel to the X-Y plane). For example, the damping materials 90 may be gel or any other damping material with buffer effect. By arranging the damping materials 90, the oscillating effect of the optical member driving mechanism 1 may be reduced. Therefore, after arriving to a predetermined position, the carrier 30 may rapidly become stable.

In the present embodiment, the carrier 30 further includes a plurality of damping material limiting portions 31, which protrude towards the circuit component 80, and extend in the first direction (Z-axis). In addition, the damping materials 90 are disposed between the damping material limiting portions 31 and the circuit component 80. By arranging the damping material limiting portions 31, the contact area between the damping materials 90 and the carrier 30 may be increased, enhancing the buffer effect of the damping materials 90. Therefore, the carrier 30 may become stable more rapidly after moving.

In addition, as viewed in the light exit direction Do, the carrier 30 further includes a plurality of first bonding recesses 32A, which are disposed in the carrier 30 and adjacent to the optical member 40. In the present embodiment, the first bonding recesses 32A are symmetrically disposed towards the optical member 40, wherein the optical axis O is the axis of symmetry. The first bonding recesses 32A are arranged along a second direction (Y-axis), wherein the second direction is perpendicular to the first direction (Z-axis) and the optical axis (X-axis). An adhesive (not shown) may be disposed in the first bonding recesses 32A in order to bond the optical member 40 to the carrier 30 stably.

Figure 5:
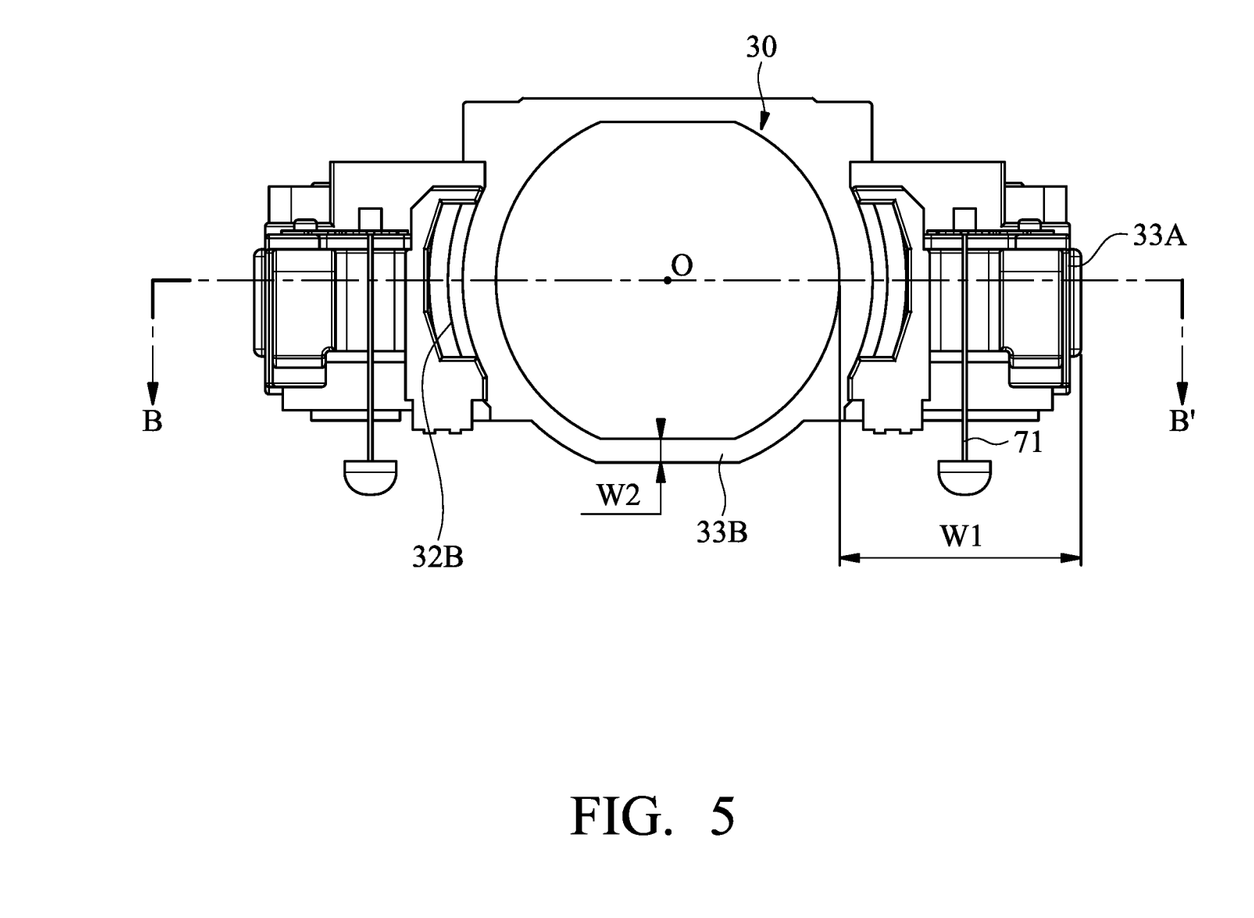
FIG. 5 is a schematic view illustrating a carrier as viewed in a light incident direction.

Refer to FIG. 5, wherein FIG. 5 is a schematic view illustrating the carrier 30 as viewed in a light incident direction Di. As shown in FIG. 5, as view in the light incident direction Di, the carrier 30 further includes a plurality of second bonding recesses 32B, which are disposed in the carrier 30, and adjacent to the optical member 40. In other words, the first bonding recesses 32A and the second bonding recesses 32B are disposed on opposite sides of the carrier 30. In the present embodiment, the second bonding recesses 32B are symmetrically disposed towards the optical member 40, wherein the optical axis O is the axis of symmetry. The second bonding recesses 32B are also arranged along the second direction (Y-axis). Similarly, an adhesive (not shown) may be disposed in the second bonding recesses 32B in order to bond the optical member 40 to the carrier 30.

In addition, the carrier 30 further includes two first sidewalls 33A and two second sidewalls 33B respectively located on different opposite side of the optical member 40. In the present embodiment, the first sidewalls 33A are located on left and right sides of the optical member 40, and the second sidewalls 33B are located on upper and lower sides of the optical member 40. The first sidewalls 33A are arranged along the second direction (Y-axis), and the second sidewalls 33B are arranged along the first direction (Z-axis). A first width W1 of the first sidewalls 33A is greater than a second sidewall W2. By the aforementioned design, the structural strength, along the second direction (Y-axis), of the carrier 30 may be enhanced, preventing the optical member 40 from damage due to collision.

Figure 6:
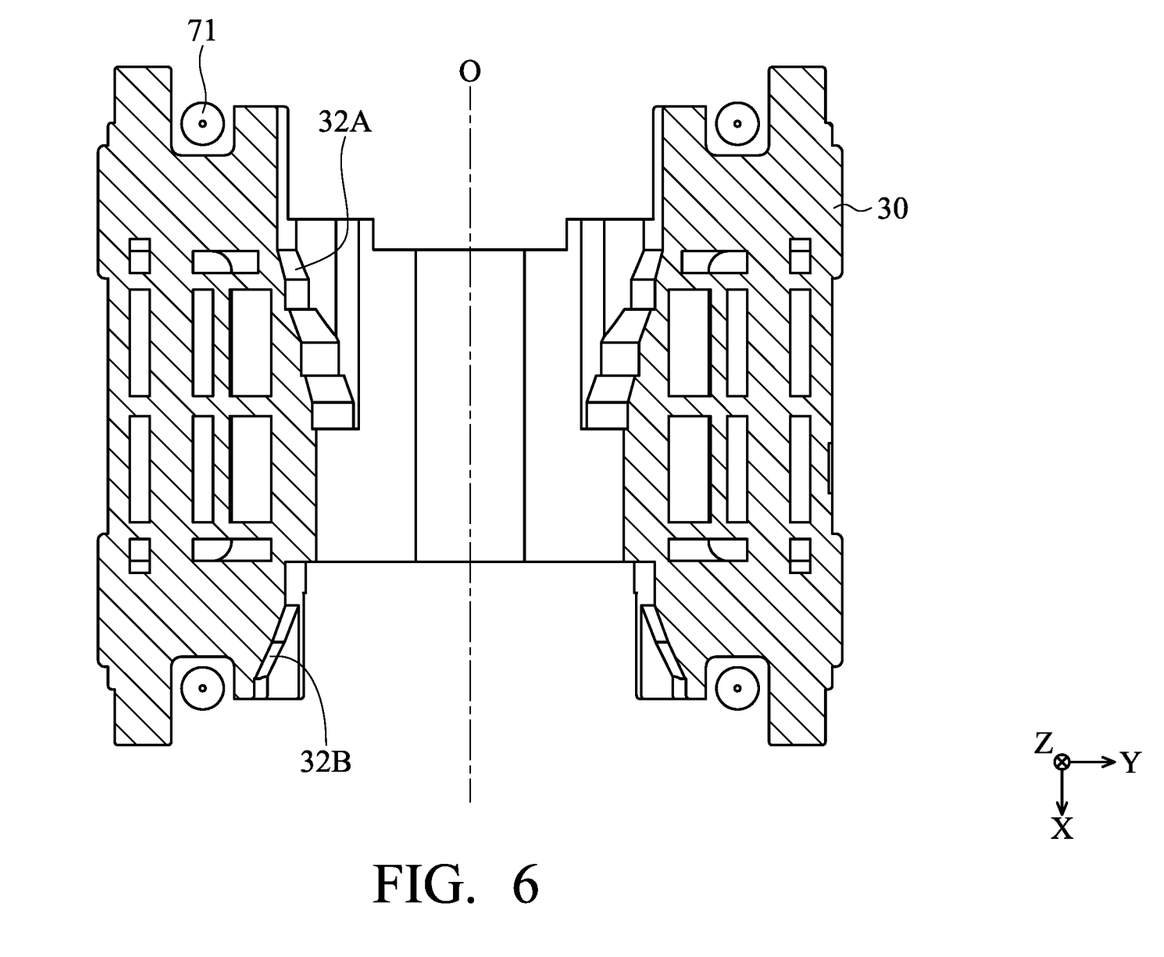
FIG. 6 is a cross-sectional view along line B-B' shown in FIG. 5.
Figure 7:
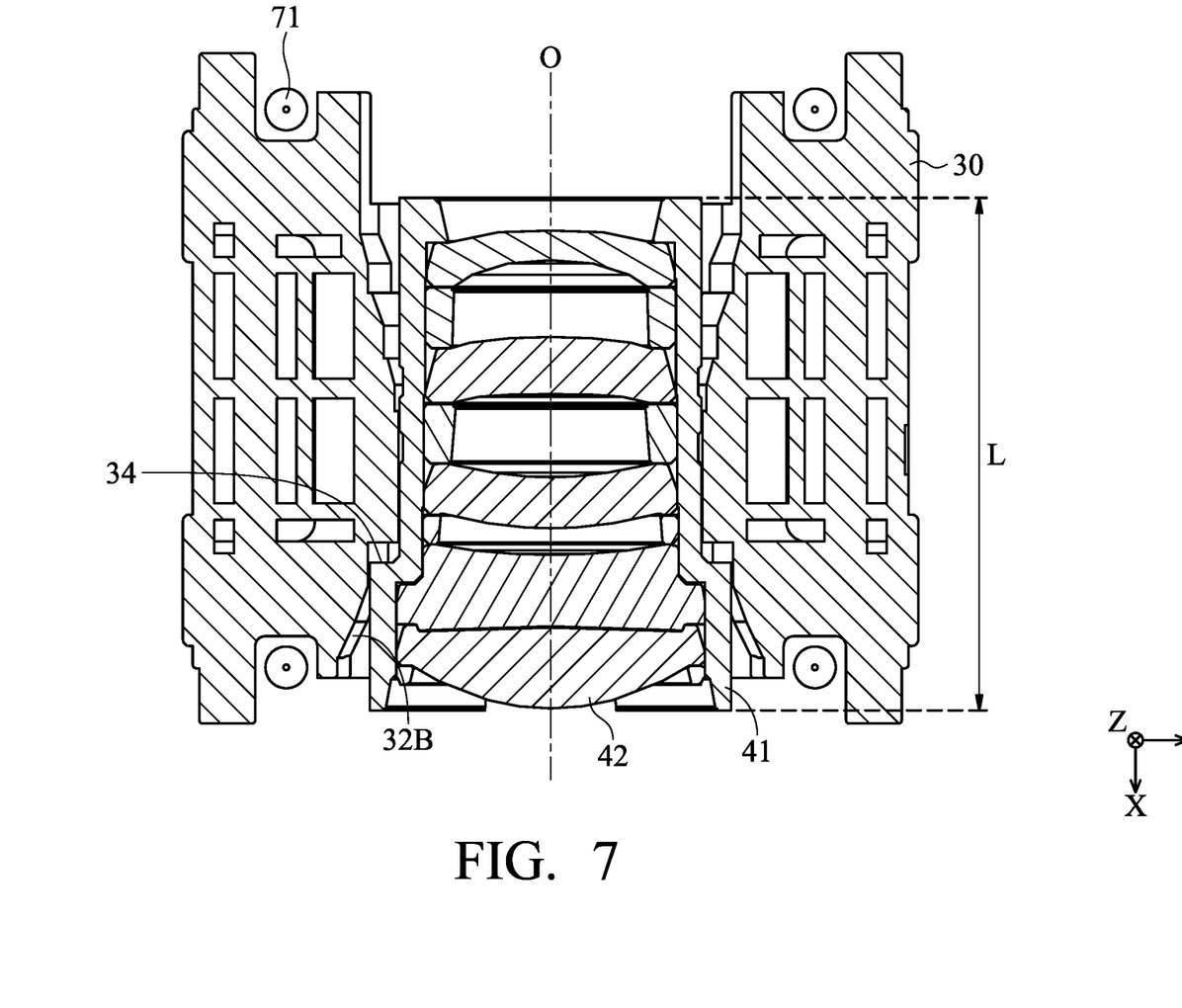
FIG. 7 is a cross-sectional view illustrating the carrier shown in FIG. 6 with an optical member.

FIG. 6 is a cross-sectional view along line B-B' shown in FIG. 5. As shown in FIG. 6, as viewed along the optical axis O, the first bonding recesses 32A and the second bonding recesses 32B at least partially overlap, and thereby the optical member 40 may be affixed to the carrier 30 more stably. In addition, FIG. 7 is a cross-sectional view illustrating the carrier 30 shown in FIG. 6 with the optical member 40. In the present embodiment, the carrier 30 has a surface 34, which faces the optical member 40, and is perpendicular to the optical axis O. The optical member 40 includes a lens barrel 41, and a length L of the optical member 40 along the optical axis O is at least greater than 5 mm. Therefore, the lens barrel 41 may contain at least five lenses 42, such that great optical effect may be achieved.

Figure 8A:
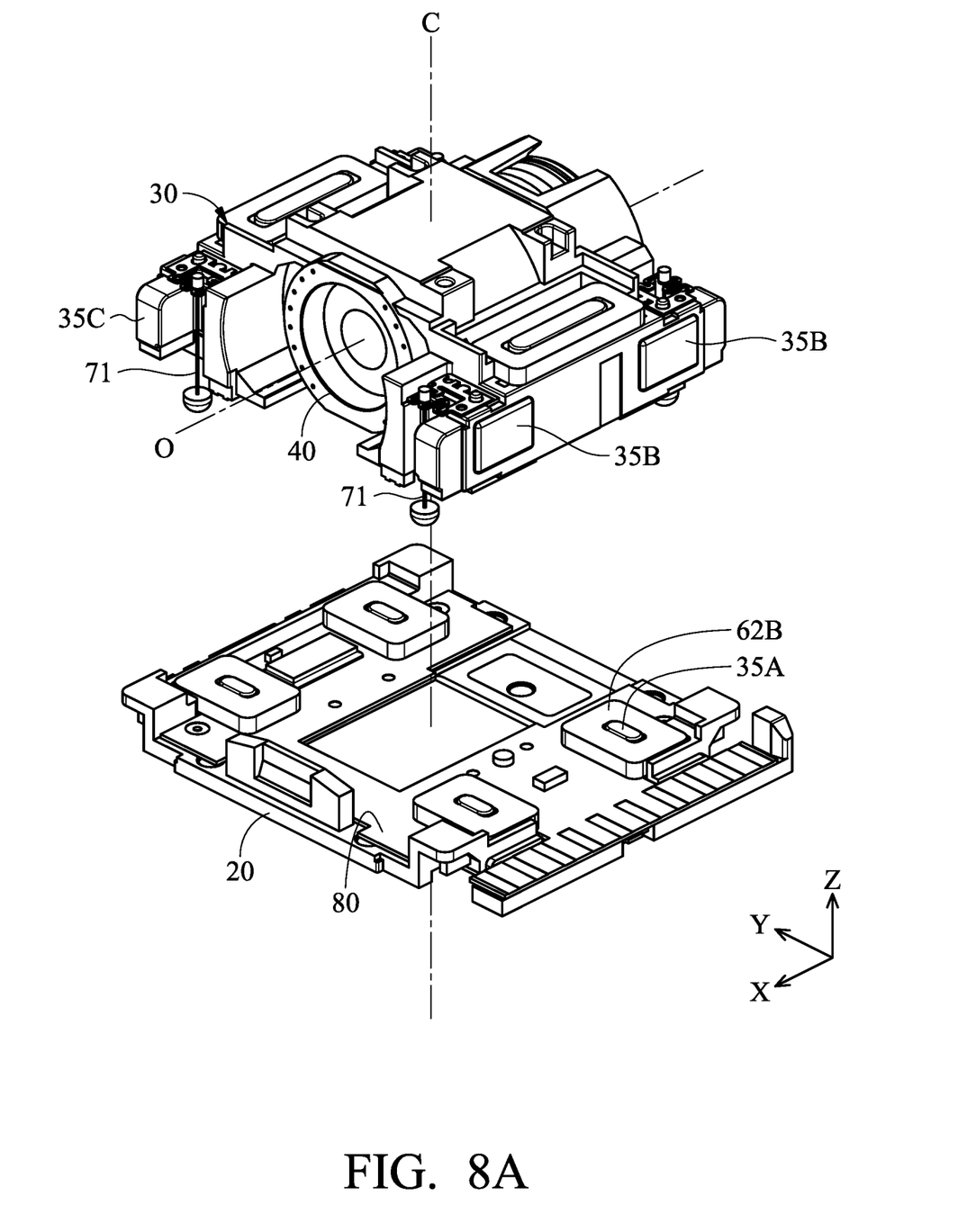
FIG. 8A is a perspective view illustrating the separated carrier and base in accordance with another embodiment of the present disclosure.

Refer to FIG. 8A, wherein FIG. 8A is a perspective view illustrating the separated carrier 30 and base 20 in accordance with one embodiment of the present disclosure. As shown in FIG. 8A, the carrier 30 further includes a first direction stopping portion 35A, a second direction stopping portion 35B, and a third direction stopping portion 35C, which are disposed on the first sidewalls for limiting the moving range of the movable portion M (including the carrier 30). For example, the first direction stopping portion 35A is disposed on a surface, which is perpendicular to the first direction (Z-axis), of the carrier 30 (namely, protruding from an X-Y plane of the carrier 30) for limiting the moving range of the movable portion M in the first direction. The second direction stopping portion 35B is disposed on a surface, which is perpendicular to the second direction (Y-axis), of the carrier 30 (namely, protruding from a Z-X plane of the carrier 30) for limiting the moving range of the movable portion M in the second direction. The third direction stopping portion 35C is disposed on a surface, which is perpendicular to the optical axis O, of the carrier 30 (namely, protruding from a Y-Z plane of the carrier 30) for limiting the moving range of the movable portion M in the optical axis O.

As viewed along the second direction (Y-axis), the third direction stopping portion 35C and the first elastic members 71 may partially overlap. In addition, the first elastic members 71 are located between the optical member 40 and the second direction stopping portion 35B, or between the optical member 40 and the third direction stopping portion 35C. By the aforementioned design, the size, in a horizontal direction (X-Y plane), of the optical member driving mechanism 1 may be effectively reduced, and thereby when the carrier 30 moves, the carrier 30 may be prevented from colliding with the circuit component 80, which is disposed on the base 20.

Figure 8B:
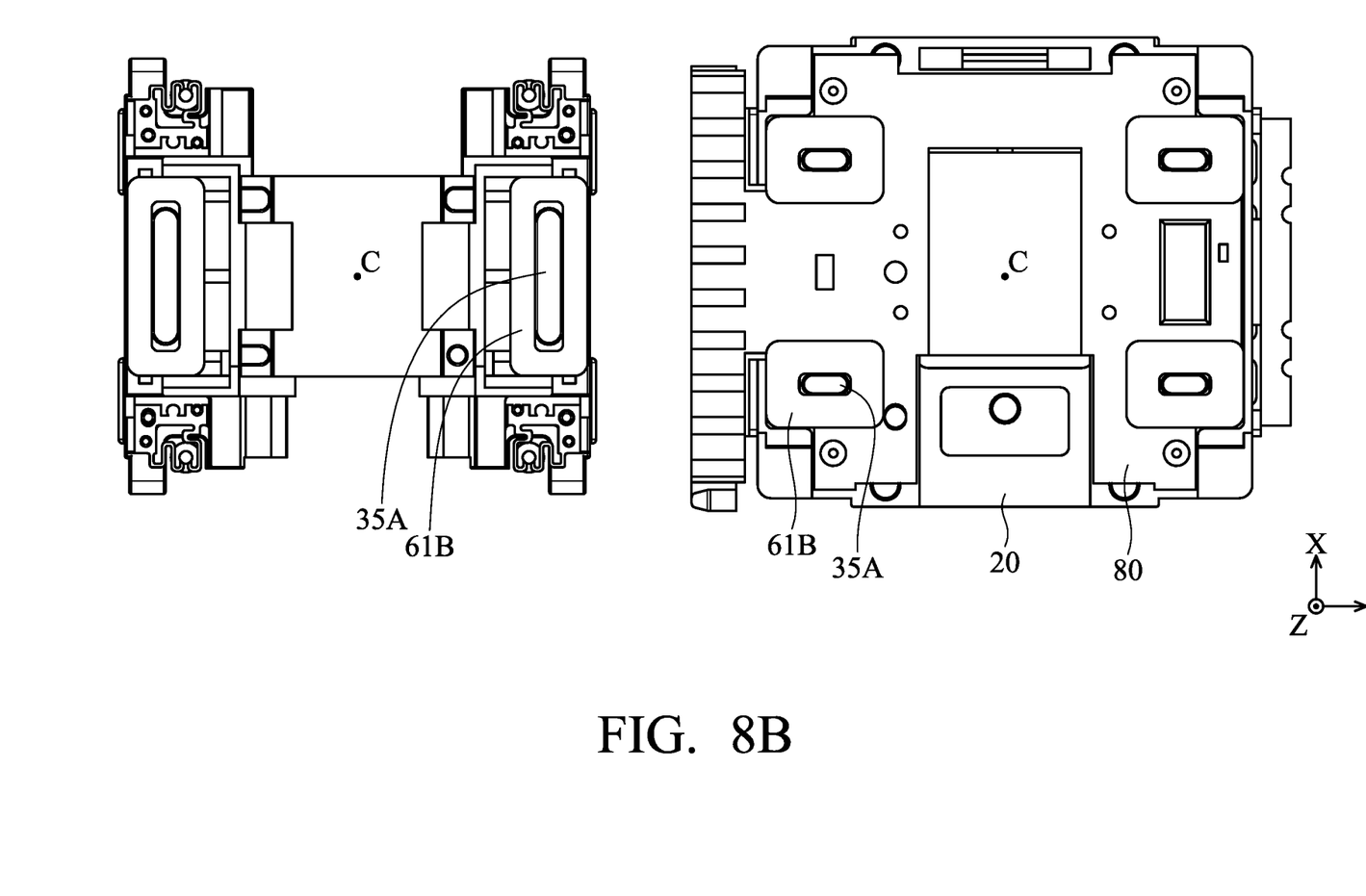
FIG. 8B is a plane view illustrating the carrier and the base shown in FIG. 8A.

FIG. 8B is a plane view illustrating the carrier 30 and the base 20 shown in FIG. 8A. The first driving coil 61B of the first driving assembly 61 is disposed around the first direction stopping portion 35A, which is located on the carrier 30. The second driving coil 62B of the second driving assembly 62 is disposed around the first direction stopping portion 35A, which is located on the base 20. It should be noted that a height of the first direction stopping portion 35A along the first direction (Z-axis) is greater than a height of the first driving coil 61B and/or the second driving coil 62B along the first direction. Therefore, the first driving coil 61B and/or the second driving coil 62B may be prevented from damage due to the collision with the movable portion M.

Figure 9:
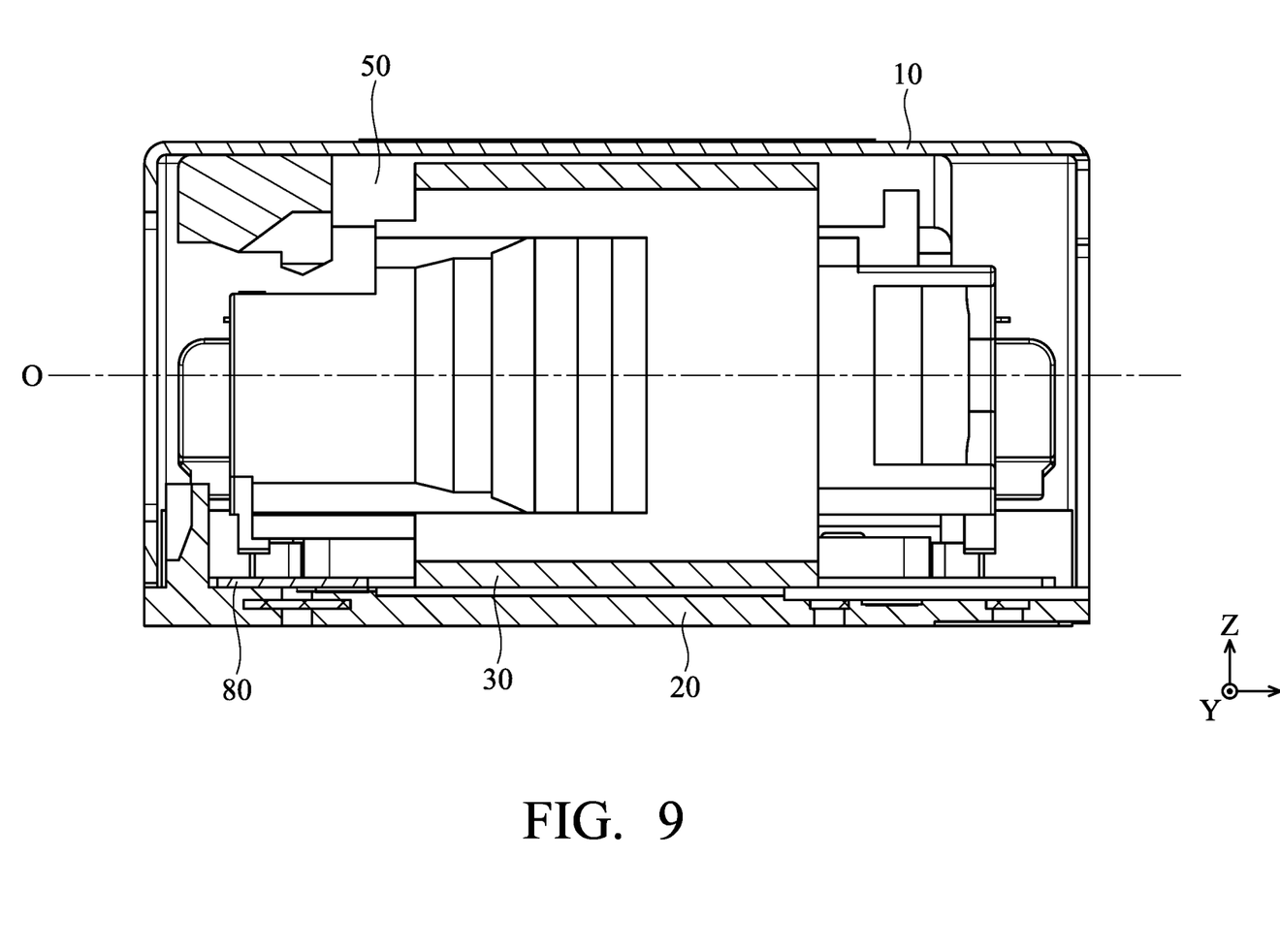
FIG. 9 is a cross-sectional view along line A-A' shown in FIG. 1.

FIG. 9 is a cross-sectional view along line A-A' shown in FIG. 1. As shown in FIG. 9, the circuit component 80 is disposed on the base 20, wherein as viewed along the second direction (Y-axis), which is perpendicular to the first direction (Z-axis), the optical axis O, the circuit component 80 and the carrier 30 partially overlap. Therefore, the size of optical member driving mechanism 1 may be reduced in Z-axis, making it easier to arrange the optical member driving mechanism 1 in thin electronic devices.

Figure 10A:
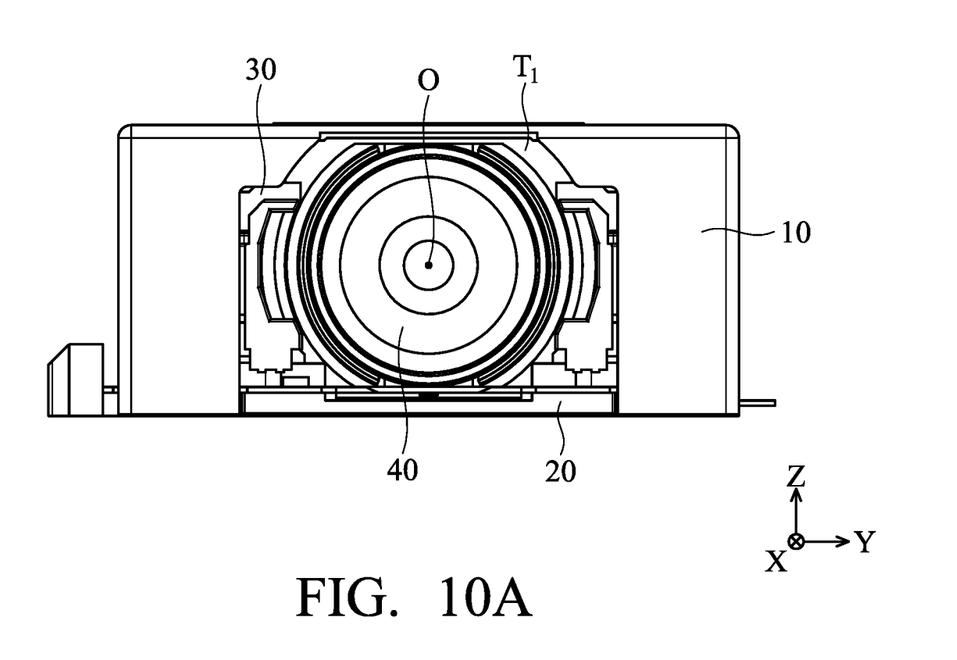
FIG. 10A is a schematic view illustrating the optical member driving mechanism shown in FIG. 1 as viewed in a light incident direction.
Figure 10B:
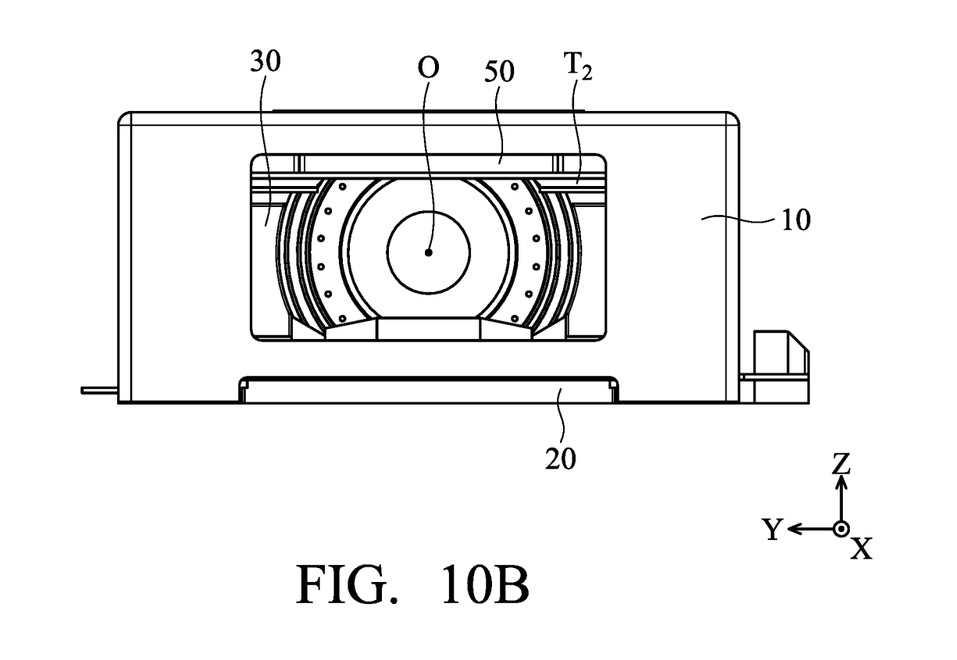
FIG. 10B is a schematic view illustrating the optical member driving mechanism shown in FIG. 1 as viewed in a light exit direction.

Refer to FIGS. 10A and 10B, wherein FIG. 10A is a schematic view illustrating the optical member driving mechanism 1 shown in FIG. 1 as viewed in the light incident direction Di, and FIG. 10B is a schematic view illustrating the optical member driving mechanism 1 shown in FIG. 1 as viewed in the light exit direction Do. As shown in FIGS. 10A and 10B, the housing 10 has four sidewalls 12, a first opening T1, and a second opening T2. The first opening T1 and the second opening T2 are respectively disposed on different sidewalls 12 of the housing 10. The first opening T1 is closer to the light incident direction Di of the optical member 40 than second opening T2, and the second opening T2 is near the image sensing member (not shown) disposed out of the optical member driving mechanism 1. The optical axis O may pass through the first opening T1 and the second opening T2. The second opening T2 is formed by the frame 50, the housing 10, and the base 20. Therefore, the first opening T1 may be greater than the second opening T2. By arranging for the second opening T2 to be smaller, the light incident to the optical member driving mechanism 1 may be concentrated on the image sensing member, increasing the image quality.

As set forth above, the present disclosure provides an optical member driving mechanism with an elastic member electrically connected to a driving assembly. By arranging for the elastic member to be a portion of the circuit, the circuit structure of the optical member driving mechanism may be simplified.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical member driving mechanism, comprising:
   a movable portion configured to connect to an optical member having an optical axis;
   a fixed portion, wherein the movable portion is movable relative to the fixed portion;
   a driving assembly driving the movable portion to move relative to the fixed portion; and
   at least three damping materials located on an imaginary plane, wherein the imaginary plane is parallel to the optical axis.

2. The optical member driving mechanism as claimed in claim 1, wherein when viewed along the optical axis, the fixed portion having a polygonal structure further comprises a first side and a second side, the first side extends in a first direction, the second side extends in a second direction, a length of the first side is less than a length of the second side, and the first direction is not parallel to the second direction.

3. The optical member driving mechanism as claimed in claim 1, wherein the imaginary plane is parallel to the second side, and the first direction is perpendicular to the second direction.

4. The optical member driving mechanism as claimed in claim 1, wherein the movable portion further comprises a plurality of damping material limiting portions, and the damping materials are respectively disposed between each of the damping material limiting portions and the fixed portion.

5. The optical member driving mechanism as claimed in claim 4, wherein a lower surface of each of the damping material limiting portions has at least one protrusion disposed towards the fixed portion.

6. The optical member driving mechanism as claimed in claim 5, wherein the damping materials are each disposed on the protrusion of each of the damping material limiting portions.

7. The optical member driving mechanism as claimed in claim 4, wherein the damping material limiting portion has a plurality of protrusions formed on the lower surface, and the damping materials are disposed between two of the protrusions.

8. The optical member driving mechanism as claimed in claim 4, wherein a width of one of the damping materials is less than a width of the corresponding damping material limiting portion.

9. The optical member driving mechanism as claimed in claim 1, wherein when viewed along the optical axis, the optical member is located between two of the damping materials.

10. The optical member driving mechanism as claimed in claim 1, further comprising a plurality of first elastic members extending in a third direction that is perpendicular to the optical axis, wherein when viewed along the optical axis, the damping materials are located between the first elastic members.

11. The optical member driving mechanism as claimed in claim 10, wherein the first elastic members comprise metallic material and are configured to transmit electrical signals.

12. The optical member driving mechanism as claimed in claim 10, further comprising a plurality of second elastic members extending in a fourth direction that is perpendicular to the third direction, wherein the second elastic members are connected to the first elastic members and the movable portion.

13. The optical member driving mechanism as claimed in claim 1, wherein the damping materials contact the movable portion and the fixed portion.

14. The optical member driving mechanism as claimed in claim 1, wherein the driving assembly comprises:
    a magnetic member; and
    a driving coil, wherein the magnetic member or the driving coil is disposed on the movable portion, and the other of the magnetic member or the driving coil is disposed on the fixed portion.

15. The optical member driving mechanism as claimed in claim 1, wherein when viewed in a direction that is parallel to the optical axis, the driving assembly does not overlap the damping materials.

16. The optical member driving mechanism as claimed in claim 1, wherein the fixed portion further comprises:
   a circuit component; and
   a base, wherein the circuit component is disposed on the base, and the damping materials are disposed on the circuit component.

17. The optical member driving mechanism as claimed in claim 1, wherein the fixed portion has a top surface and a plurality of sidewalls extending from edges of the top surface, a first opening and a second opening are respectively disposed on the sidewalls, and the optical axis passes through the first opening and the second opening.

18. The optical member driving mechanism as claimed in claim 17, wherein a size of the first opening is different from a size of the second opening.

19. The optical member driving mechanism as claimed in claim 18, wherein the first opening is closer to a light incident direction of the optical member than the second opening, and the first opening is greater than the second opening.

20. The optical member driving mechanism as claimed in claim 1, wherein a plurality of bonding recesses are formed on the movable portion, and the bonding recesses are symmetrically disposed towards the optical member.

* * * * *